United States Patent
Xu

(10) Patent No.: US 8,572,983 B2
(45) Date of Patent: Nov. 5, 2013

(54) GAS TURBINE ENGINE COMPONENT WITH IMPINGEMENT AND DIFFUSIVE COOLING

(75) Inventor: JinQuan Xu, Groton, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 13/544,231

(22) Filed: Jul. 9, 2012

(65) Prior Publication Data

US 2013/0205793 A1 Aug. 15, 2013

Related U.S. Application Data

(60) Provisional application No. 61/599,310, filed on Feb. 15, 2012.

(51) Int. Cl.
*F02C 1/00* (2006.01)
(52) U.S. Cl.
USPC ............................................... 60/752; 60/806
(58) Field of Classification Search
USPC ................... 60/752–760, 806; 415/115, 116; 416/96 R, 97 R
See application file for complete search history.

(56) References Cited

U.S. PATENT DOCUMENTS

| | | |
|---|---|---|
| 4,153,386 A | 5/1979 | Leogrande et al. |
| 4,197,443 A | 4/1980 | Sidenstick |
| 4,529,358 A | 7/1985 | Papell |
| 4,622,821 A | 11/1986 | Madden |
| 4,653,279 A | 3/1987 | Reynolds |
| 4,653,983 A | 3/1987 | Vehr |
| 4,672,727 A | 6/1987 | Field |
| 4,684,323 A | 8/1987 | Field |
| 4,700,544 A | 10/1987 | Fucci |
| 4,738,588 A | 4/1988 | Field |
| 5,062,768 A | 11/1991 | Marriage |
| 5,096,379 A | 3/1992 | Stroud et al. |
| 5,129,231 A | 7/1992 | Becker et al. |
| 5,252,026 A | 10/1993 | Shepherd |
| 5,326,224 A | 7/1994 | Lee et al. |
| 5,358,374 A | 10/1994 | Correia et al. |
| 5,382,133 A | 1/1995 | Moore et al. |
| 5,418,345 A | 5/1995 | Adamski |
| 5,419,681 A | 5/1995 | Lee |

(Continued)

FOREIGN PATENT DOCUMENTS

| | | |
|---|---|---|
| EP | 1326007 A2 | 7/2003 |
| EP | 1609949 A1 | 12/2005 |

OTHER PUBLICATIONS

Kusterer, K. et al. "The Nekomimi Cooling Technology: Cooling Holes with Ears for High-Efficient Film Cooling" Proceedings of ASME Turbo Expo 2011, Jun. 6-10, 2011. 11 pages.

(Continued)

*Primary Examiner* — Phutthiwat Wongwian
(74) *Attorney, Agent, or Firm* — Kinney & Lange, P.A.

(57) ABSTRACT

A gas turbine engine component includes a gas path wall having a first surface and second surface and an impingement baffle having impingement holes for directing cooling fluid onto the first surface of the gas path wall. A cooling hole extends through the gas path wall. The cooling hole continuously diverges from an inlet in the first surface to an outlet in the second surface such that cross-sectional area of the cooling hole increases continuously from the inlet to the outlet. A longitudinal ridge divides the cooling hole into lobes.

20 Claims, 13 Drawing Sheets

(56) References Cited

U.S. PATENT DOCUMENTS

| | | |
|---|---|---|
| 5,609,779 A | 3/1997 | Crow et al. |
| 5,651,662 A | 7/1997 | Lee et al. |
| 5,660,525 A | 8/1997 | Lee et al. |
| 5,683,600 A | 11/1997 | Kelley et al. |
| 5,813,836 A | 9/1998 | Starkweather |
| 6,139,258 A | 10/2000 | Lang, III et al. |
| 6,183,199 B1 | 2/2001 | Beeck et al. |
| 6,241,468 B1 | 6/2001 | Lock et al. |
| 6,243,948 B1 | 6/2001 | Lee et al. |
| 6,287,075 B1 | 9/2001 | Kercher |
| 6,307,175 B1 | 10/2001 | Blochlinger et al. |
| 6,494,678 B1 | 12/2002 | Bunker |
| 6,547,524 B2 | 4/2003 | Kohli et al. |
| 6,572,335 B2 | 6/2003 | Kuwabara et al. |
| 6,744,010 B1 | 6/2004 | Pepe et al. |
| 6,944,580 B1 | 9/2005 | Blume et al. |
| 6,973,419 B1 | 12/2005 | Fortin et al. |
| 6,979,176 B2 | 12/2005 | Nakamata et al. |
| 7,186,085 B2 | 3/2007 | Lee |
| 7,273,351 B2 | 9/2007 | Kopmels |
| 7,328,580 B2 | 2/2008 | Lee et al. |
| 7,374,401 B2 | 5/2008 | Lee |
| 7,578,653 B2 | 8/2009 | Klasing et al. |
| 7,726,131 B2 | 6/2010 | Sze et al. |
| 7,766,609 B1 | 8/2010 | Liang |
| 7,887,294 B1 | 2/2011 | Liang |
| 7,997,868 B1 | 8/2011 | Liang |
| 8,038,399 B1 | 10/2011 | Liang |
| 8,057,181 B1 | 11/2011 | Liang |
| 8,066,484 B1 | 11/2011 | Liang |
| 8,079,812 B2 * | 12/2011 | Okita .......................... 416/97 R |
| 8,245,519 B1 * | 8/2012 | Liang .............................. 60/806 |
| 2001/0036401 A1 | 11/2001 | Harvey et al. |
| 2002/0159888 A1 | 10/2002 | Rinck et al. |
| 2005/0106020 A1 | 5/2005 | Bunker et al. |
| 2008/0003096 A1 | 1/2008 | Kohli et al. |
| 2008/0145208 A1 | 6/2008 | Klasing et al. |
| 2009/0013695 A1 | 1/2009 | Dierberger et al. |
| 2009/0074575 A1 | 3/2009 | Propheter-Hinckley et al. |
| 2009/0304499 A1 | 12/2009 | Strock et al. |
| 2010/0068032 A1 | 3/2010 | Liang |
| 2010/0068068 A1 | 3/2010 | Liang |
| 2010/0282721 A1 | 11/2010 | Bunker et al. |
| 2011/0097191 A1 | 4/2011 | Bunker |
| 2011/0185572 A1 | 8/2011 | Wei et al. |
| 2011/0293423 A1 | 12/2011 | Bunker et al. |
| 2012/0051941 A1 | 3/2012 | Bunker |
| 2012/0167389 A1 | 7/2012 | Lacy et al. |

OTHER PUBLICATIONS

The PCT International Search Report mailed May 29, 2013 for International Application No. PCT/US2013/026035.

* cited by examiner

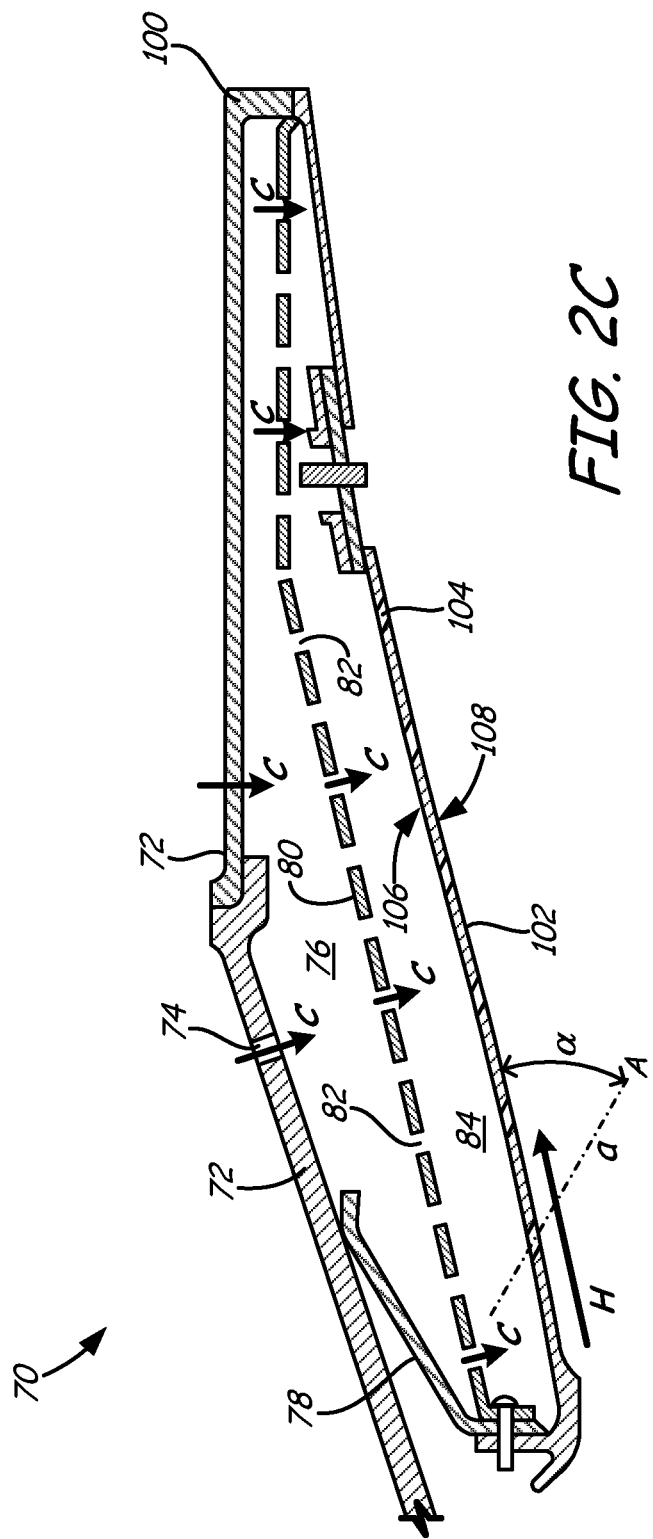

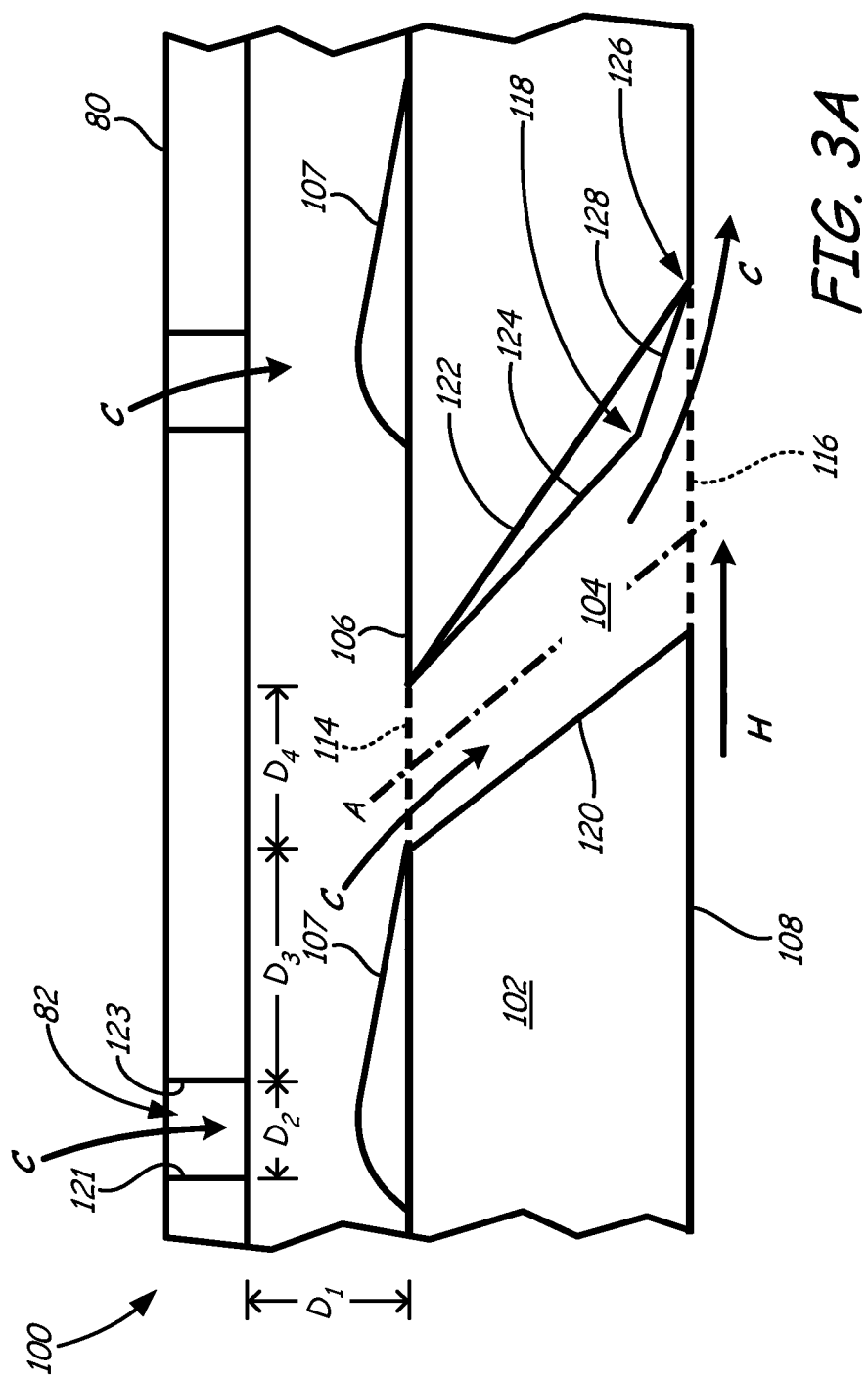

GAS TURBINE ENGINE COMPONENT WITH IMPINGEMENT AND DIFFUSIVE COOLING

CROSS REFERENCE TO RELATED APPLICATION

This application claims priority to U.S. Provisional Application No. 61/599,310, filed on Feb. 15, 2012, and entitled "Gas Turbine Engine Component with Impingement and Diffusive Cooling Hole," the disclosure of which is incorporated by reference in its entirety.

BACKGROUND

This invention relates generally to turbomachinery, and specifically to turbine flow path components for gas turbine engines. In particular, the invention relates to cooling techniques for airfoils and other gas turbine engine components exposed to hot working fluid flow, including, but not limited to, rotor blades and stator vane airfoils, endwall surfaces including platforms, shrouds and compressor and turbine casings, combustor liners, turbine exhaust assemblies, thrust augmentors and exhaust nozzles.

Gas turbine engines are rotary-type combustion turbine engines built around a power core made up of a compressor, combustor and turbine, arranged in flow series with an upstream inlet and downstream exhaust. The compressor section compresses air from the inlet, which is mixed with fuel in the combustor and ignited to generate hot combustion gas. The turbine section extracts energy from the expanding combustion gas, and drives the compressor section via a common shaft. Expanded combustion products are exhausted downstream, and energy is delivered in the form of rotational energy in the shaft, reactive thrust from the exhaust, or both.

Gas turbine engines provide efficient, reliable power for a wide range of applications in aviation, transportation and industrial power generation. Small-scale gas turbine engines typically utilize a one-spool design, with co-rotating compressor and turbine sections. Larger-scale combustion turbines including jet engines and industrial gas turbines (IGTs) are generally arranged into a number of coaxially nested spools. The spools operate at different pressures, temperatures and spool speeds, and may rotate in different directions.

Individual compressor and turbine sections in each spool may also be subdivided into a number of stages, formed of alternating rows of rotor blade and stator vane airfoils. The airfoils are shaped to turn, accelerate and compress the working fluid flow, or to generate lift for conversion to rotational energy in the turbine.

Industrial gas turbines often utilize complex nested spool configurations, and deliver power via an output shaft coupled to an electrical generator or other load, typically using an external gearbox. In combined cycle gas turbines (CCGTs), a steam turbine or other secondary system is used to extract additional energy from the exhaust, improving thermodynamic efficiency. Gas turbine engines are also used in marine and land-based applications, including naval vessels, trains and armored vehicles, and in smaller-scale applications such as auxiliary power units.

Aviation applications include turbojet, turbofan, turboprop and turboshaft engine designs. In turbojet engines, thrust is generated primarily from the exhaust. Modern fixed-wing aircraft generally employ turbofan and turboprop configurations, in which the low pressure spool is coupled to a propulsion fan or propeller. Turboshaft engines are employed on rotary-wing aircraft, including helicopters, typically using a reduction gearbox to control blade speed. Unducted (open rotor) turbofans and ducted propeller engines also known, in a variety of single-rotor and contra-rotating designs with both forward and aft mounting configurations.

Additional turbine engine applications and turbine engine types include intercooled, regenerated or recuperated and variable cycle gas turbine engines, and combinations thereof. In particular, these applications include intercooled turbine engines, for example with a relatively higher pressure ratio, regenerated or recuperated gas turbine engines, for example with a relatively lower pressure ratio or for smaller-scale applications, and variable cycle gas turbine engines, for example for operation under a range of flight conditions including subsonic, transonic and supersonic speeds. Combined intercooled and regenerated/recuperated engines are also known, in a variety of spool configurations with traditional and variable cycle modes of operation.

Aviation turbines generally utilize two and three-spool configurations, with a corresponding number of coaxially rotating turbine and compressor sections. In two-spool designs, the high pressure turbine drives a high pressure compressor, forming the high pressure spool or high spool. The low-pressure turbine drives the low spool and fan section, or a shaft for a rotor or propeller. In three-spool engines, there is also an intermediate pressure spool. Aviation turbines are also used to power auxiliary devices including electrical generators, hydraulic pumps and elements of the environmental control system, for example using bleed air from the compressor or via an accessory gearbox.

Turbofan engines are commonly divided into high and low bypass configurations. High bypass turbofans generate thrust primarily from the fan, which accelerates airflow through a bypass duct oriented around the engine core. This design is common on commercial aircraft and transports, where noise and fuel efficiency are primary concerns. The fan rotor may also operate as a first stage compressor, or as a pre-compressor stage for the low-pressure compressor or booster module. Variable-area nozzle surfaces can also be deployed to regulate the bypass pressure and improve fan performance, for example during takeoff and landing. Advanced turbofan engines may also utilize a geared fan drive mechanism to provide greater speed control, reducing noise and increasing engine efficiency, or to increase or decrease specific thrust.

Low bypass turbofans produce proportionally more thrust from the exhaust flow, generating greater specific thrust for use in high-performance applications including supersonic jet aircraft. Low bypass turbofan engines may also include variable-area exhaust nozzles and afterburner or augmentor assemblies for flow regulation and short-term thrust enhancement. Specialized high-speed applications include continuously afterburning engines and hybrid turbojet/ramjet configurations.

Across these applications, turbine performance depends on the balance between higher pressure ratios and core gas path temperatures, which tend to increase efficiency, and the related effects on service life and reliability due to increased stress and wear. This balance is particularly relevant to gas turbine engine components in the hot sections of the compressor, combustor, turbine and exhaust sections, where active cooling is required to prevent damage due to high gas path temperatures and pressures.

SUMMARY

This invention concerns a gas turbine engine component having a gas path wall and an impingement baffle. The gas turbine engine component includes a gas path wall having a first surface and second surface. The impingement baffle has impingement holes for directing cooling fluid onto the first surface of the gas path wall. A cooling hole extends through the gas path wall. The cooling hole continuously diverges from an inlet in the first surface to an outlet in the second surface such that cross-sectional area of the cooling hole increases continuously from the inlet to the outlet. A longitudinal ridge divides the cooling hole into lobes.

Another embodiment of the present invention is a liner assembly for a gas turbine engine. The liner assembly includes an impingement baffle and a liner wall having a first surface extending along the impingement baffle and a second surface extending opposite the first surface. A cooling hole is formed in the liner wall. The cooling hole diverges continuously from an inlet in the first surface to an outlet in the second surface. A longitudinal ridge divides the cooling hole into lobes. The cooling hole is substantially diffusive from the inlet in the first surface of the liner wall to the outlet in the second surface of the liner wall.

BRIEF DESCRIPTION OF THE DRAWINGS

FIG. 2C is a cross-sectional view of an impingement and film cooling assembly for the gas turbine engine.

FIG. 3A is a cross-sectional view of a cooling hole of a gas path wall for the cooling assembly, taken in a longitudinal direction.

DETAILED DESCRIPTION

Figure 1:
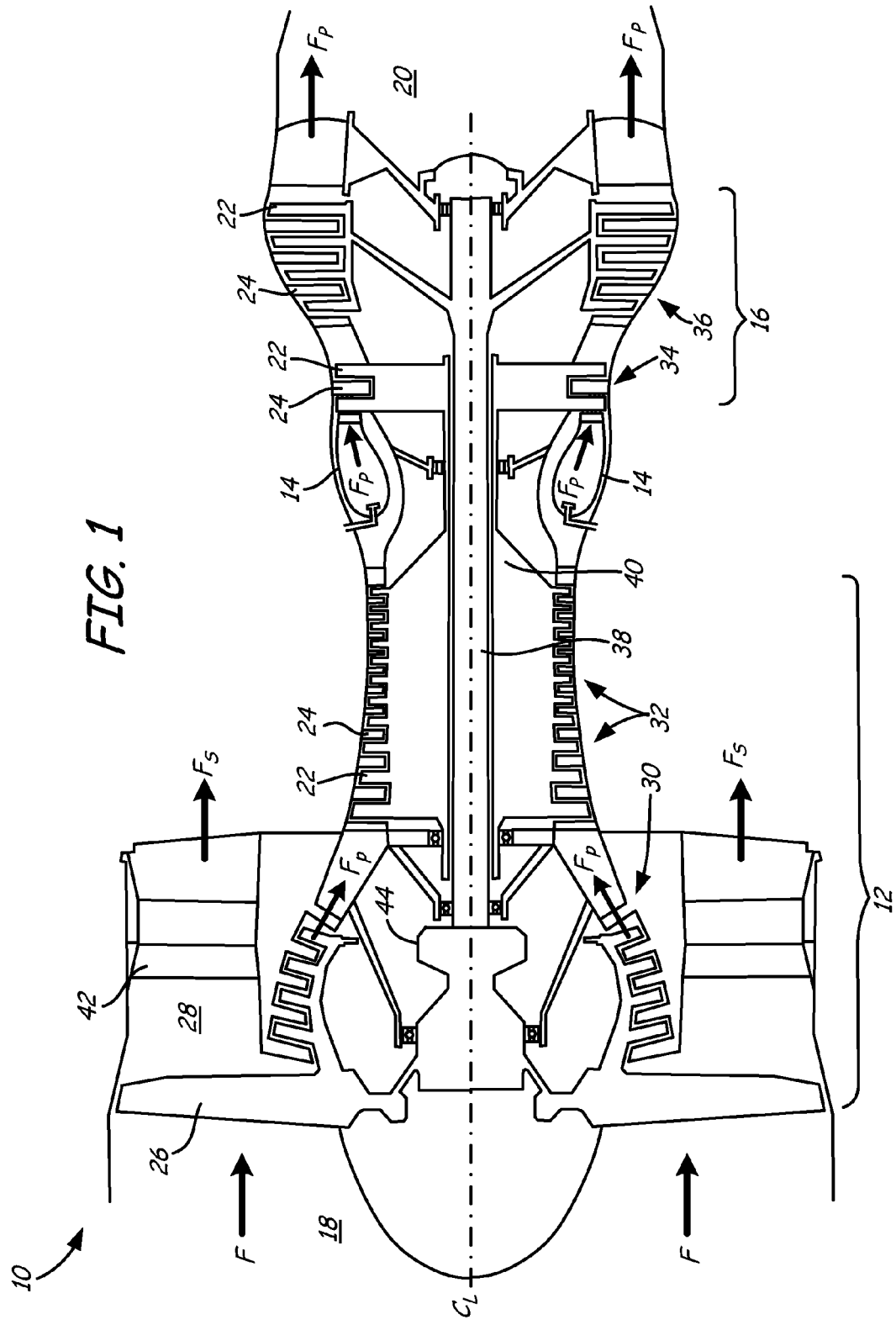
FIG. 1 is a cross-sectional view of a gas turbine engine.

FIG. 1 is a cross-sectional view of gas turbine engine 10. Gas turbine engine (or turbine engine) 10 includes a power core with compressor section 12, combustor 14 and turbine section 16 arranged in flow series between upstream inlet 18 and downstream exhaust 20. Compressor section 12 and turbine section 16 are arranged into a number of alternating stages of rotor airfoils (or blades) 22 and stator airfoils (or vanes) 24.

In the turbofan configuration of FIG. 1, propulsion fan 26 is positioned in bypass duct 28, which is coaxially oriented about the engine core along centerline (or turbine axis) $C_L$. An open-rotor propulsion stage 26 may also provided, with turbine engine 10 operating as a turboprop or unducted turbofan engine. Alternatively, fan rotor 26 and bypass duct 28 may be absent, with turbine engine 10 configured as a turbojet or turboshaft engine, or an industrial gas turbine.

For improved service life and reliability, components of gas turbine engine 10 are provided with an improved cooling configuration, as described below. Suitable components for the cooling configuration include rotor airfoils 22, stator airfoils 24 and other gas turbine engine components exposed to hot gas flow, including, but not limited to, platforms, shrouds, casings and other endwall surfaces in hot sections of compressor 12 and turbine 16, and liners, nozzles, afterburners, augmentors and other gas wall components in combustor 14 and exhaust section 20.

In the two-spool, high bypass configuration of FIG. 1, compressor section 12 includes low pressure compressor (LPC) 30 and high pressure compressor (HPC) 32, and turbine section 16 includes high pressure turbine (HPT) 34 and low pressure turbine (LPT) 36. Low pressure compressor 30 is rotationally coupled to low pressure turbine 36 via low pressure (LP) shaft 38, forming the LP spool or low spool. High pressure compressor 32 is rotationally coupled to high pressure turbine 34 via high pressure (HP) shaft 40, forming the HP spool or high spool.

Flow F at inlet 18 divides into primary (core) flow $F_P$ and secondary (bypass) flow $F_S$ downstream of fan rotor 26. Fan rotor 26 accelerates secondary flow $F_S$ through bypass duct 28, with fan exit guide vanes (FEGVs) 42 to reduce swirl and improve thrust performance. In some designs, structural guide vanes (SGVs) 42 are used, providing combined flow turning and load bearing capabilities.

Primary flow $F_P$ is compressed in low pressure compressor 30 and high pressure compressor 32, then mixed with fuel in combustor 14 and ignited to generate hot combustion gas. The combustion gas expands to provide rotational energy in high pressure turbine 34 and low pressure turbine 36, driving high pressure compressor 32 and low pressure compressor 30, respectively. Expanded combustion gases exit through exhaust section (or exhaust nozzle) 20, which can be shaped or actuated to regulate the exhaust flow and improve thrust performance.

Low pressure shaft 38 and high pressure shaft 40 are mounted coaxially about centerline $C_L$, and rotate at different speeds. Fan rotor (or other propulsion stage) 26 is rotationally coupled to low pressure shaft 38. In advanced designs, fan drive gear system 44 is provided for additional fan speed control, improving thrust performance and efficiency with reduced noise output.

Fan rotor 26 may also function as a first-stage compressor for gas turbine engine 10, and LPC 30 may be configured as an intermediate compressor or booster. Alternatively, propulsion stage 26 has an open rotor design, or is absent, as described above. Gas turbine engine 10 thus encompasses a wide range of different shaft, spool and turbine engine configurations, including one, two and three-spool turboprop and (high or low bypass) turbofan engines, turboshaft engines, turbojet engines, and multi-spool industrial gas turbines.

In each of these applications, turbine efficiency and performance depend on the overall pressure ratio, defined by the total pressure at inlet 18 as compared to the exit pressure of compressor section 12, for example at the outlet of high pressure compressor 32, entering combustor 14. Higher pressure ratios, however, also result in greater gas path temperatures, increasing the cooling loads on rotor airfoils 22, stator airfoils 24 and other components of gas turbine engine 10. To reduce operating temperatures, increase service life and maintain engine efficiency, these components are provided with improved cooling configurations, as described below. Suitable components include, but are not limited to, cooled gas turbine engine components in compressor sections 30 and 32, combustor 14, turbine sections 34 and 36, and exhaust section 20 of gas turbine engine 10.

Figure 2A:
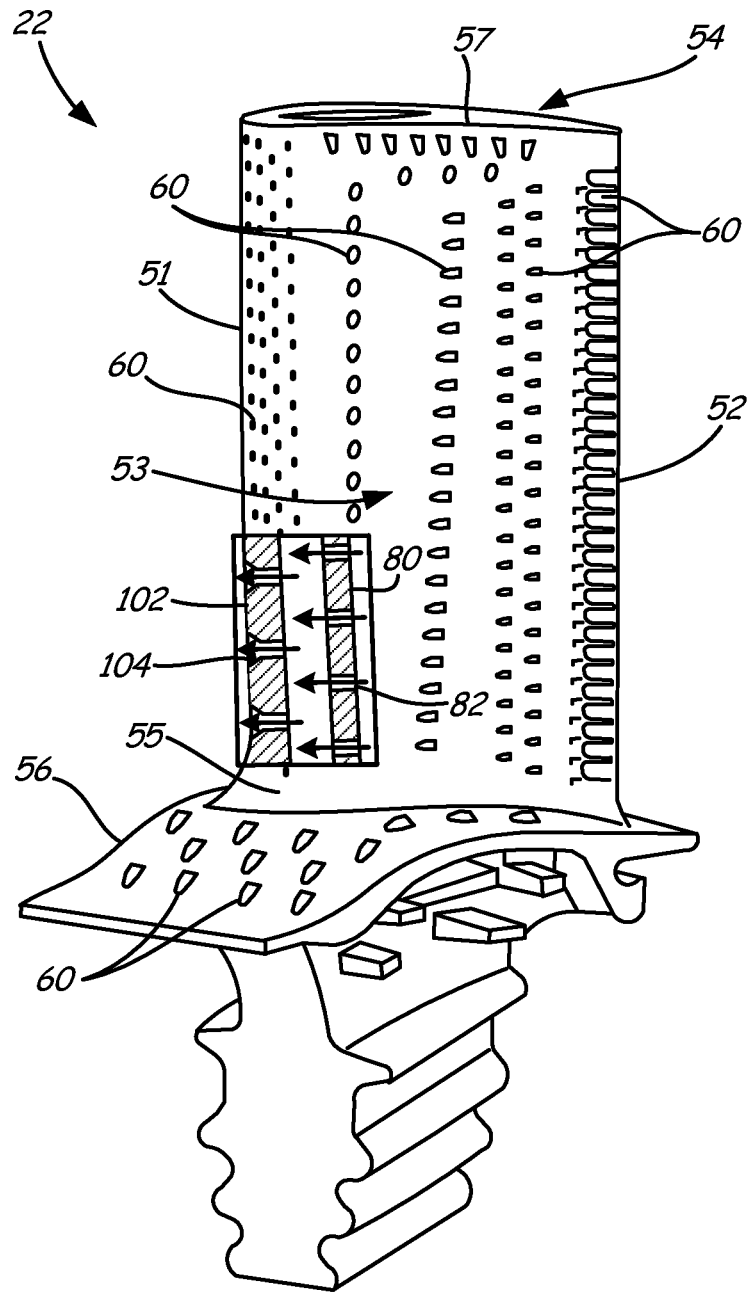
FIG. 2A is a perspective view of an airfoil for the gas turbine engine, in a rotor blade configuration.

FIG. 2A is a perspective view of rotor airfoil (or blade) 22 for gas turbine engine 10, as shown in FIG. 1, or for another turbomachine. Rotor airfoil 22 extends axially from leading edge 51 to trailing edge 52, defining pressure surface 53 (front) and suction surface 54 (back) therebetween.

Pressure and suction surfaces 53 and 54 form the major opposing surfaces or walls of airfoil 22, extending axially between leading edge 51 and trailing edge 52, and radially from root section 55, adjacent inner diameter (ID) platform 56, to tip section 57, opposite ID platform 56. In some designs, tip section 57 is shrouded.

Cooling holes or outlets 60 are provided on one or more surfaces of airfoil 22, for example along leading edge 51, trailing edge 52, pressure (or concave) surface 53, or suction (or convex) surface 54, or a combination thereof. Cooling holes or passages 60 may also be provided on the endwall surfaces of airfoil 22, for example along ID platform 56, or on a shroud or engine casing adjacent tip section 57.

In addition, FIG. 2A also shows impingement baffle 80 (also called impingement film float wall or splash plate) in cutaway view, with impingement holes 82, as described below with respect to FIG. 2C, for impingement cooling of the inner surface of the hot gas wall of turbine engine component 22. The inset image is not to scale. Here, film cooling holes 60 are formed as cooling holes 104 in the hot gas path wall formed by any one of leading edge 51, trailing edge 52, pressure surface 53, suction surface 54 or platform surface 56. Impingement baffle 80 can also be utilized with other inner and outer hot gas path walls 102 and surfaces 106 and 108 of other turbine components, including, but not limited to, combustors, turbine exhaust assemblies, nozzle components, turbine blades, blade outer air seals, and stator airfoil 24 of FIG. 2B.

Figure 2B:
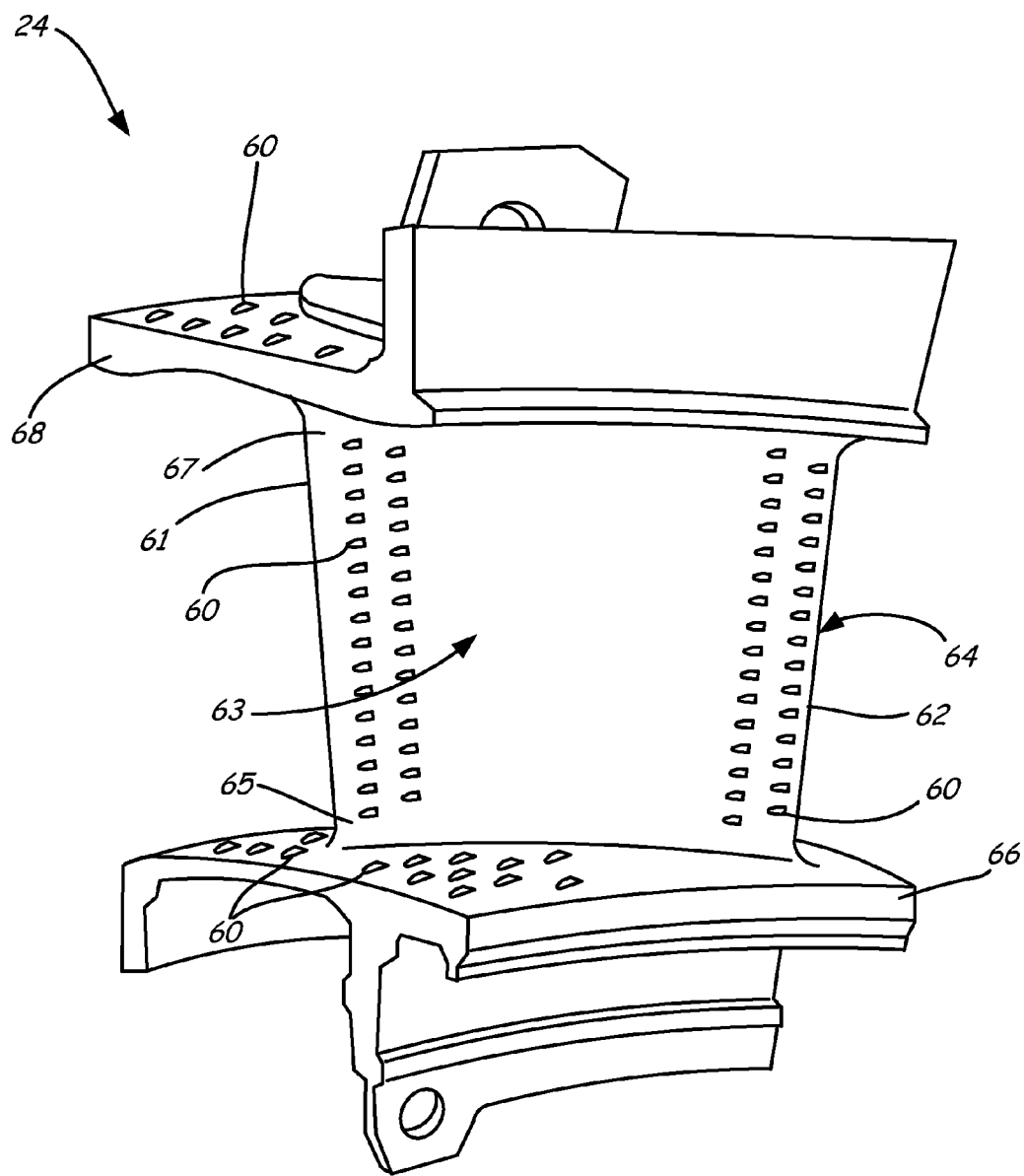
FIG. 2B is a perspective view of an airfoil for the gas turbine engine, in a stator vane configuration.

FIG. 2B is a perspective view of stator airfoil 24 for gas turbine engine 10, as shown in FIG. 1, or for another turbomachine. Stator airfoil 24 extends axially from leading edge 61 to trailing edge 62, defining pressure surface 63 (front) and suction surface 64 (back) therebetween. Pressure and suction surfaces 63 and 64 extend from inner (or root) section 65, adjacent ID platform 66, to outer (or tip) section 67, adjacent outer diameter (OD) platform 68.

Cooling holes or outlets 60 are provided along one or more surfaces of airfoil 24, for example leading or trailing edge 61 or 62, pressure (concave) or suction (convex) surface 63 or 64, or a combination thereof. Cooling holes or passages 60 may also be provided on the endwall surfaces of airfoil 24, for example along ID platform 66 and OD platform 68.

Rotor airfoils 22 (FIG. 2A) and stator airfoils 24 (FIG. 2B) are formed of high strength, heat resistant materials such as high temperature alloys and superalloys, and are provided with thermal and erosion-resistant coatings. Airfoils 22 and 24 are also provided with internal cooling holes 60 to reduce thermal mechanical fatigue and wear, and to prevent melting when exposed to hot gas flow in the higher temperature regions of a gas turbine engine or other turbomachine. Cooling holes 60 deliver cooling fluid (e.g., steam or air from a compressor) through the outer walls and platform structures of airfoils 22 and 24, creating a thin layer (or film) of cooling fluid to protect the outer (gas path) surfaces from high temperature flow.

While surface cooling extends service life and increases reliability, injecting cooling fluid into the gas path also reduces engine efficiency, and the cost in efficiency increases with the required cooling flow. Cooling holes 60 are thus provided with improved metering and inlet geometry to reduce jets and blow off, and improved diffusion and exit geometry to reduce flow separation and corner effects. Cooling holes 60 reduce flow requirements and improve the spread of cooling fluid across the hot surfaces of airfoils 22 and 24, and other gas turbine engine components, so that less flow is needed for cooling and efficiency is maintained or increased.

FIG. 2C is a cross-sectional view of impingement and film cooling assembly 70. Assembly 70 includes outer case 72 with cooling fluid apertures 74 for directing cooling fluid flow C into cooling fluid plenum 76, with seal 78 and impingement baffle 80 having impingement holes 82 for impingement cooling of turbine component 100 along gas path wall 102.

As shown in FIG. 2C, gas path wall 102 extends along impingement baffle 80, across impingement plenum 84. First surface 106 of gas path wall 102 is exposed to impingement flow of cooling fluid C from cooling fluid plenum 76, through impingement holes (or holes) 82 in impingement baffle 80. Second surface 108 extends opposite first surface 106, and is exposed to hot gas flow H, for example combustion gas or exhaust gas. Cooling holes 104 extend from impingement plenum 84 at first surface 106 through gas path wall 102 to second surface 108.

Cooling fluid C is supplied to cooling plenum 76 via cooling holes 74 in an outer turbine case or other plenum boundary 72. Cooling fluid C from cooling plenum 76 is supplied to impingement plenum 84 via impingement holes 82 in impingement baffle 80, where impingement holes 82 are sized to produce jets of cooling fluid flow C impinging onto first surface 106 of gas path wall 102.

Typically, impingement holes 82 are pointed at first surface 106 of gas path wall 102 between cooling holes 104. Depending on application, the spacing between baffle wall (impingement plenum) 84 and gas path wall 102 may be equal to or less than about three times the inlet diameter of cooling holes 104.

Cooling holes 104 extend through gas path wall 102 from first (relatively cool) surface 106 to second (relatively hot) surface 108. Axis A is an approximate longitudinal axis of flow of cooling holes 104. Axis A is inclined in a downstream sense at angle α with respect to the direction of hot gas flow H, in order to encourage attached flow along second surface 108 of gas path wall 102. In some embodiments, cooling holes 104 also have a circumferential component, in order to encourage tangential film flow.

The example of FIG. 2C is merely representative, and varies from application to application. For example, cooling assembly 70 may be configured for use with a turbine exhaust assembly or similar gas turbine engine component 100 in low pressure turbine 36 or exhaust section 20 of gas turbine engine 10, as shown in FIG. 1, or with a combustor liner assembly or similar gas turbine engine component 100 for combustor 14. Alternatively, cooling assembly 70 may be configured for use with a cooled turbine liner or casing component 100 in high pressure turbine 34 or low pressure turbine 36, a hot section compressor liner or casing component 100 for high pressure compressor 32, or an exhaust nozzle liner or augmentor component 100 for exhaust section 20.

In airfoil applications, cooling assembly 70 is configured for use with rotor airfoil 22, stator airfoil 24 or other airfoil component 100, with cooling hole 104 forming cooling hole 60 in a pressure surface, suction surface or platform surface, as shown in FIGS. 2A and 2B. Impingement baffle 80 extends within airfoil component 100, adjacent first surface 106 of gas path wall 102, where first surface 106 is an inner surface of the airfoil, and second surface 108 is an outer surface exposed to hot working fluid flow.

The components of cooling assembly 70 are typically manufactured from durable heat-resistant materials such as high-temperature metal alloys or superalloys, in order to protect from hot gas flow H. In addition, thermal barrier coatings and other protective coatings may be used, as described above for airfoils 22 and 24. To further improve service life and reliability, cooling holes 104 are configured with improved metering and diffusive flow geometries, as described below.

Figure 3B:
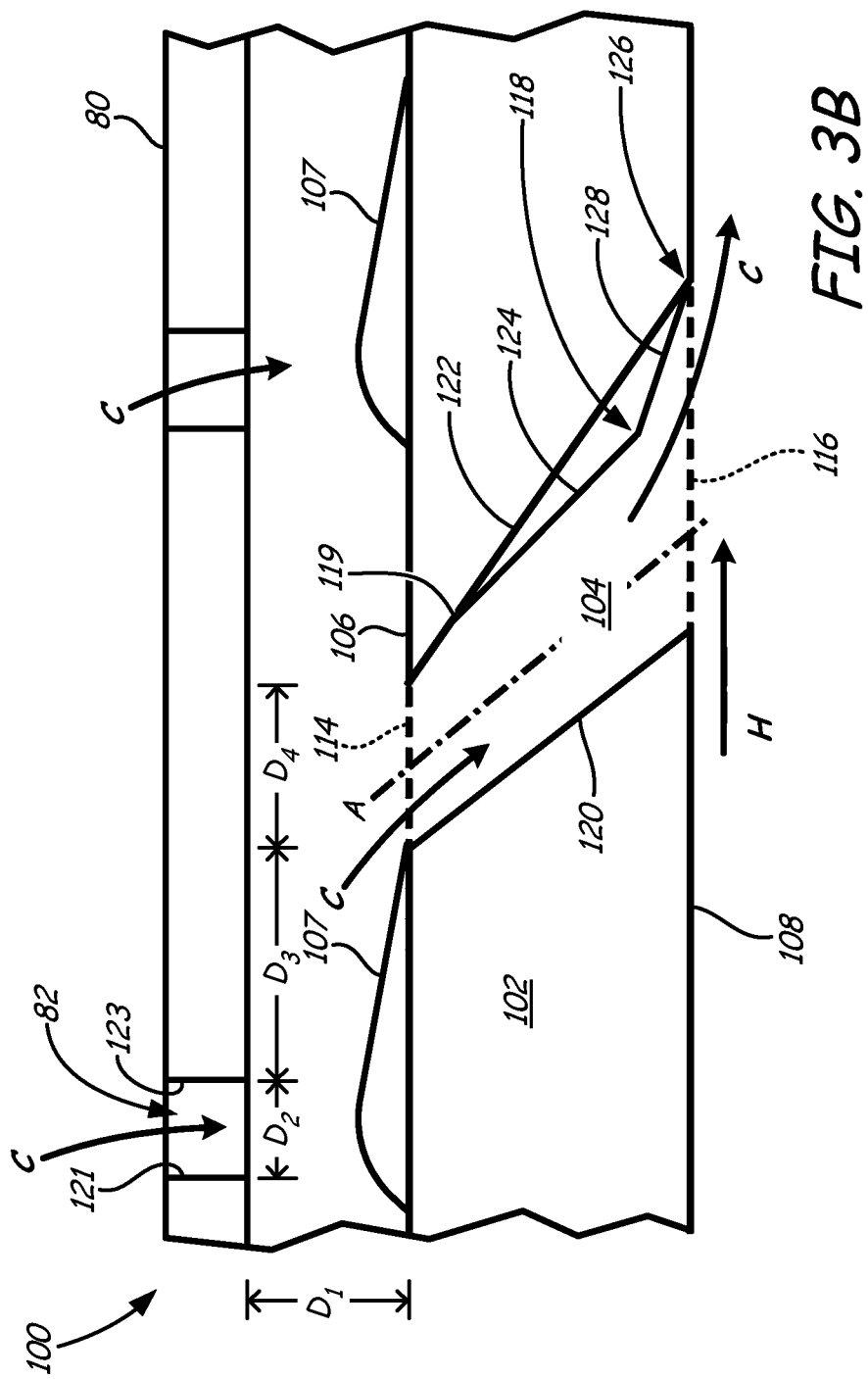
FIG. 3B is a cross-sectional view of the gas path wall, showing the cooling hole with a truncated ridge configuration.

FIG. 3A is a cross-sectional view of gas turbine engine component (turbine or turbomachinery component) 100 with gas path wall 102, taken in a longitudinal direction and that carries a cool first surface 106 and an opposite, hot second surface 108. Cooling hole 104 extends through gas path wall 102 from first surface 106 to second surface 108. FIG. 3A also shows impingement baffle 80 with impingement holes 82, forming an impingement and film cooling assembly 70, as described above (see also FIGS. 3B, 3C, below).

Cooling fluid C flows through impingement hole 82 to first surface 106 to provide impingement cooling on first surface 106. Cooling fluid C then flows along first surface 106 to and through cooling hole 104. In the illustrated embodiment, first surface 106 includes bump 107 substantially aligned with impingement hole 82. Bump 107 is a structure with a convex surface extending from first surface 106 toward impingement baffle 80. Bump 107 can increase heat transfer surface area of a portion of first surface 106 exposed to impingement cooling from impingement hole 82 as cooling fluid C flows over bump 107. Bump 107 can have an aerodynamic shape that has a relatively steep slope in a longitudinally upstream direction and a relatively gradual slope in a longitudinally downstream direction toward inlet 114 of cooling hole 104. In an alternative embodiment, bump 107 can have a shape such as a hemisphere, other than as illustrated. In further alternative embodiments, bump 107 can be omitted.

Gas path wall 102 of component 100 is exposed to cooling fluid C on first surface 106, with longitudinal hot gas flow H along second surface 108. In some components, for example airfoils, first surface 106 is an inner surface, and second surface 108 is an outer surface. In other components, for example combustor liners and exhaust assemblies, first surface 106 is an outer surface, and second surface 108 is an inner surface. More generally, the terms inner and outer are merely representative, and may be interchanged.

Cooling hole 104 delivers cooling fluid C from first surface 106 of wall 102 to second surface 108, for example to provide diffusive flow and film cooling. Cooling hole 104 is inclined along axis A in a downstream direction with respect to hot gas flow H, in order to improve cooling fluid coverage over second surface 108, with less separation and reduced flow mixing. Longitudinal ridge 124 is provided to reduce flow swirl and flow vortex at outlet 116. Outlet 116 defines a perimeter of cooling hole 104 at an intersection of cooling hole 104 and second surface 108. Surfaces 120, 122, 130, and 132 of cooling hole 104 define cooling hole 104 between inlet 114 and outlet 116.

Impingement baffle 80 is spaced from first surface 106 of gas path wall 102 by distance $D_1$. Impingement hole 82 has a distance $D_2$ from its upstream surface 121 to its downstream surface 123. Cooling hole 104 has a distance $D_4$ from its upstream surface 120 to its downstream surface 122 at inlet 114. Distance $D_3$ is a distance in a longitudinal direction, defined along hot gas flow H, from downstream surface 123 of impingement hole 82 to upstream surface 120 of cooling hole 104. In one embodiment, distance $D_1$ can be less than or equal to three times distance $D_2$. Distance $D_3$ can be equal to between one times distance $D_2$ and ten times distance $D_2$. These relationships can provide for relatively effective film cooling of first surface 106. In embodiments where impingement hole 82 is substantially cylindrical and inlet 114 is substantially circular, distance $D_2$ can be less than distance $D_4$. This can be useful in embodiments where impingement holes 82 are paired with and positioned upstream of cooling holes 104 to allow impingement holes 82 to provide a flow metering function for cooling holes 104. In embodiments where impingement hole 82 is not cylindrical and/or inlet 114 is not circular, a flow area of impingement hole 82 can be less than a flow area of inlet 114 to provide a similar flow metering function.

In alternative embodiments, impingement hole 82 need not be cylindrical. For example, impingement hole 82 could be an elongated slot. In that embodiment, there can be a substantially greater number of cooling holes 104 than impingement holes 82. Alternatively, impingement holes 82 could be micro-holes through impingement baffle 80, with a flow area substantially less than that of cooling hole 104 and in a quantity that is substantially greater than that of cooling hole 104. In these embodiments, a total flow area of impingement holes 82 can be less than a total flow area of inlets 114 to provide a similar flow metering function.

As shown in FIG. 3A, cooling hole 104 extends along axis A from inlet 114 at first surface 106 of gas path wall 102 to outlet 116 at second surface 108. In one embodiment, cooling hole 104 is continuously divergent throughout, with continuously increasing cross sectional flow area from inlet 114 through cooling hole 104 to outlet 116. Thus, cooling hole 104 has substantially no convergent or constant-area metering portion between inlet 114 and outlet 116, nor any transition between such a convergent or constant-area metering portion and a diffusion portion. Instead, regulation of cooling flow C is provided by inlet 114, and flow is diffusive through cooling hole 104 over substantially the entire length from inlet 114 at first surface 106 to outlet 116 at second surface 108. In addition, metering may be provided by impingement holes or other flow control structures, for example impingement holes 82.

Cooling hole 104 is substantially diffusive (or divergent) between inlet 114 and outlet 116, and from first surface 106 to second surface 108 of gas path wall 102. As shown in FIG. 3A, for example, upstream and downstream surfaces 120 and 122 of cooling hole 104 diverge continuously along axis A between inlet 114 and outlet 116. In particular, upstream surface 120 and downstream surface 122 diverge away from one another in the longitudinal direction, as defined along hot gas flow H. This increases the cross sectional area (or flow area) of cooling hole 104, providing diffusive flow to increase the coverage of cooling fluid C along second surface 108 of gas path wall 102.

Longitudinal ridge 124 is formed as a ridge or rib structure along downstream surface 122 of cooling hole 104. Longitudinal ridge 124 extends out from downstream surface 122 toward axis A, separating cooling hole 104 into lobes to discourage swirl flow and reduce flow mixing at outlet 116.

In one particular configuration, longitudinal ridge 124 extends from inlet 114 to outlet 116, as shown in FIG. 3A, in order to reduce swirl components over substantially the entire length of cooling hole 104. Alternatively, longitudinal ridge 124 is truncated between inlet 114 and outlet 116, or extends to form a cusp at inlet 114, as described below.

Cooling hole 104 may also include transition region 128. Transition region 128 extends from ridge transition 118 to trailing edge 126 of outlet 116, in order to increase flow attachment and reduce flow separation along second surface 108 of gas path wall 102. In some embodiments, transition region 128 can be flat or planar. Alternatively, transition region 128 can be non-flat and non-planar, such as curved (e.g. convex) longitudinally and/or laterally.

FIG. 3B is a cross-sectional view of gas turbine engine component 100 with gas path wall 102, showing cooling hole 104 with longitudinal ridge 124 in a truncated configuration. In this configuration, longitudinal ridge 124 extends from a ridge terminus 119, spaced along axis A between inlet 114 and outlet 116. This truncated configuration provides diffusive flow from inlet 114 through ridge terminus 119 to outlet 116, and discourages swirl flow from ridge terminus 119 through outlet 116.

Figure 3C:
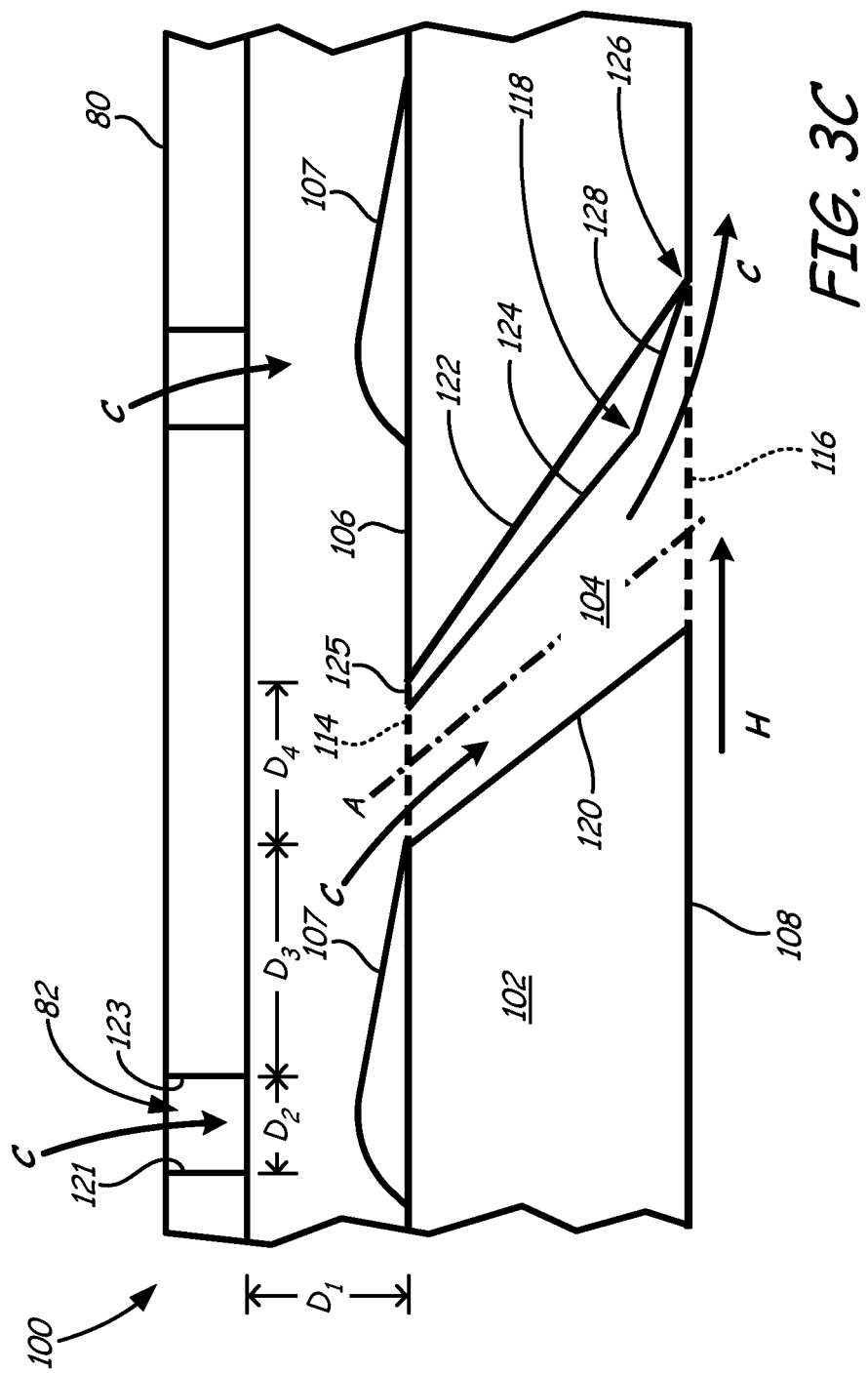
FIG. 3C is a cross-sectional view of the gas path wall, showing the cooling hole with a cusped inlet configuration.

FIG. 3C is a cross-sectional view of gas turbine engine component 100 with gas path wall 102, showing cooling hole 104 with a cusped configuration at inlet 114. In this configuration, longitudinal ridge 124 extends outward (toward axis A) from downstream surface 122 at first surface 106 of gas path wall 102, forming a cusp 125 on inlet 114. Cusp 125 extends congruently with longitudinal ridge 124 along cooling hole 104, from inlet 114 toward outlet 116.

The cross-sectional geometry of cooling hole 104 also varies, as described above, and as shown in the figures. The design of cooling hole 104 is not limited to these particular examples, moreover, but also encompasses different combinations and variations of the features that are described, including different features for longitudinal ridge 124, transition 118, ridge terminus 119, and transition region 128.

Figure 4A:
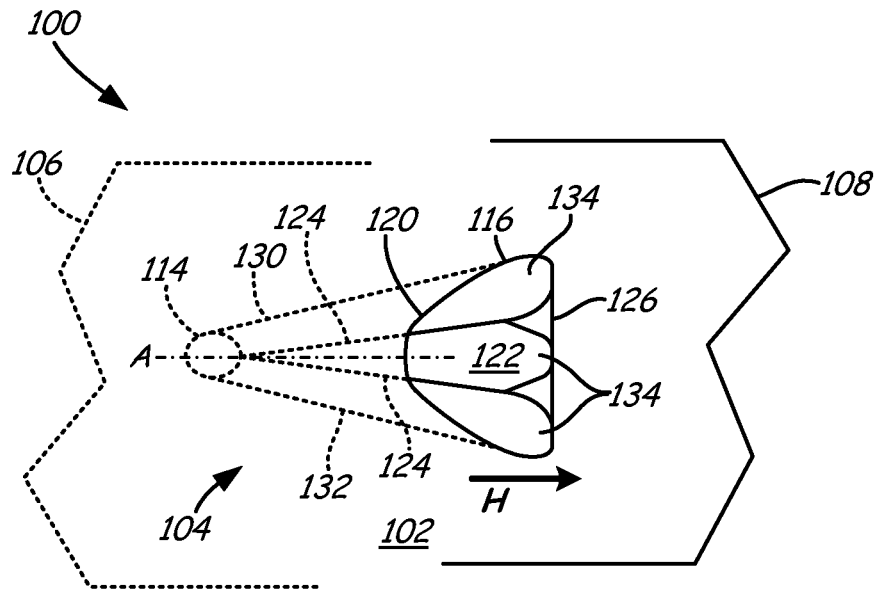
FIG. 4A is a schematic view of the gas path wall, illustrating a three-lobe cooling hole geometry.

FIG. 4A is a schematic view of gas turbine engine component 100 with gas path wall 102, illustrating a three-lobe geometry for cooling hole 104. Cooling hole 104 extends from inlet 114 on first surface 106 (dashed line) of gas path wall 102 to outlet 116 on second surface 108 (solid line). Second surface 108 is exposed to hot gas flow H in a downstream longitudinal direction, as described above.

Lateral (side) surfaces 130 and 132 of cooling hole 104 diverge continuously along axis A, from inlet 114 at first surface 106 to outlet 116 at second surface 108. In particular, side surfaces 130 and 132 diverge in a lateral direction, substantially transverse or perpendicular to hot gas flow H, increasing the cross sectional flow area of cooling hole 104 to provide diffusive flow along substantially the entire passage length between inlet 114 and outlet 116.

Longitudinal ridges 124 separate cooling hole 104 into lobes 134. For example, two ridges 124 may extend along downstream surface 122 to divide cooling hole 104 into three lobes 134, as shown in FIG. 4A. Lobes 134 are surfaces of wall 102 which define distinct channel-like portions of the void of cooling hole 104. Longitudinal ridges 124 project out (upward) from downstream surface 122 toward axis A to discourage transverse flow components and swirl, reducing flow separation and mixing at outlet 116.

The geometry of outlet 116 is also selected to improve cooling performance, including the geometry along trailing edge 126. In particular, outlet 116 may be formed as a delta with arcuate upstream surface 120 and substantially straight trailing edge 126, transverse to hot gas glow H. Alternatively, the delta may be configured with a more or less convex trailing edge 126 (see FIG. 4B). These configurations reduce separation and increase attachment and laminar flow, for improved coverage and cooling efficiency along second surface 108 of gas path wall 102. These configurations also reduce cooling hole thermal mechanical fatigue because sharp corners or edges can be eliminated.

Figure 4B:
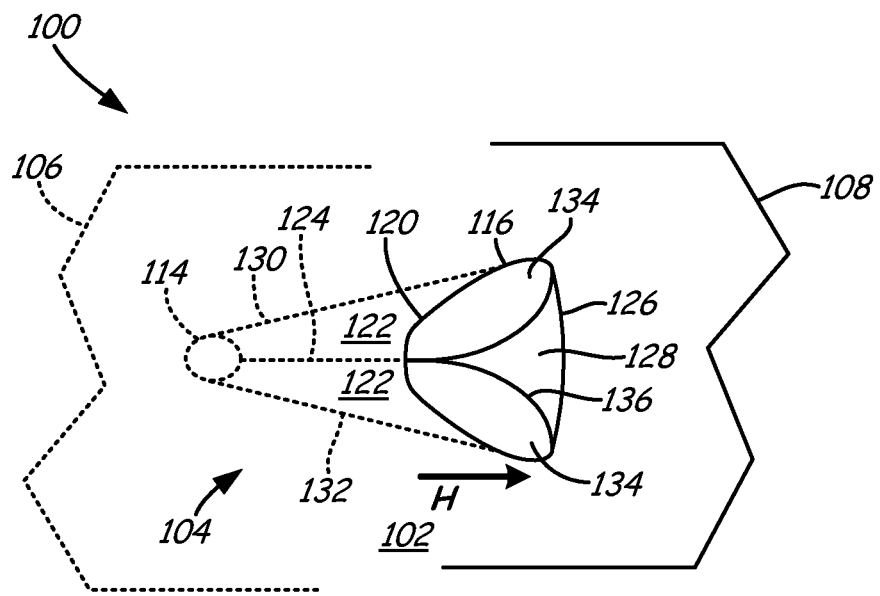
FIG. 4B is a schematic view of the gas path wall, illustrating a two-lobe cooling hole geometry.

FIG. 4B is a schematic view of gas turbine engine component 100 with gas path wall 102, illustrating a two-lobe geometry for cooling hole 104. In this configuration, a single longitudinal ridge or rib process 124 divides cooling hole 104 into two lobes 134, and outlet 116 has a delta-shaped geometry with convex trailing edge 126.

As shown in FIG. 4B, longitudinal ridge 124 extends from inlet 114 to transition region 128 extends from transition 118 to trailing edge 126 of outlet 116. In this example, longitudinal ridge 124 is formed at the intersection or interface between adjacent lobes 134, where lobes 134 have arcuate or curved surfaces along downstream surface 122, meeting at a cusped or convex longitudinal ridge 124. Alternatively, longitudinal ridge 124 may be formed at the intersection or interface between adjacent lobes 134 with substantially planar surfaces along downstream surface 122, where the substantially planar surfaces meet at a substantially triangular ridge structure 124.

Transition region 128 of cooling hole 104 is defined between arcuate extensions 136 of longitudinal ridge 124. In the particular configuration of FIG. 4B, for example, two arcuate extensions 136 form at transition 118 of longitudinal ridge 124, extending longitudinally and transversely from transition 118 to trailing edge 126 of outlet 116. In this configuration, cooling hole 104 has a (single) transition region 128, extending longitudinally from transition 118 to trailing edge 126, and transversely along substantially the entire length of trailing edge 126.

Figure 7A:
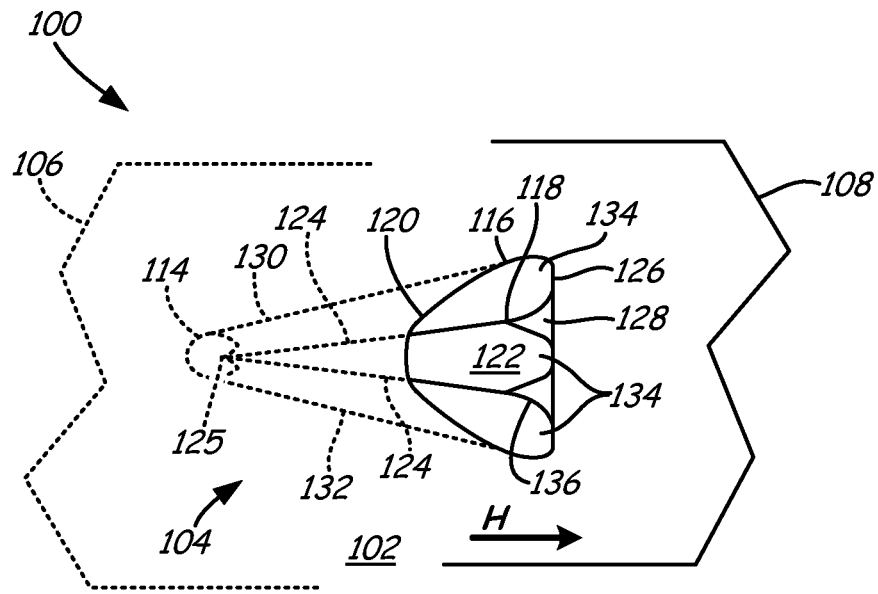
FIG. 7A is a schematic view of the gas path wall, with a three-lobe cusped inlet cooling hole geometry.
Figure 7B:
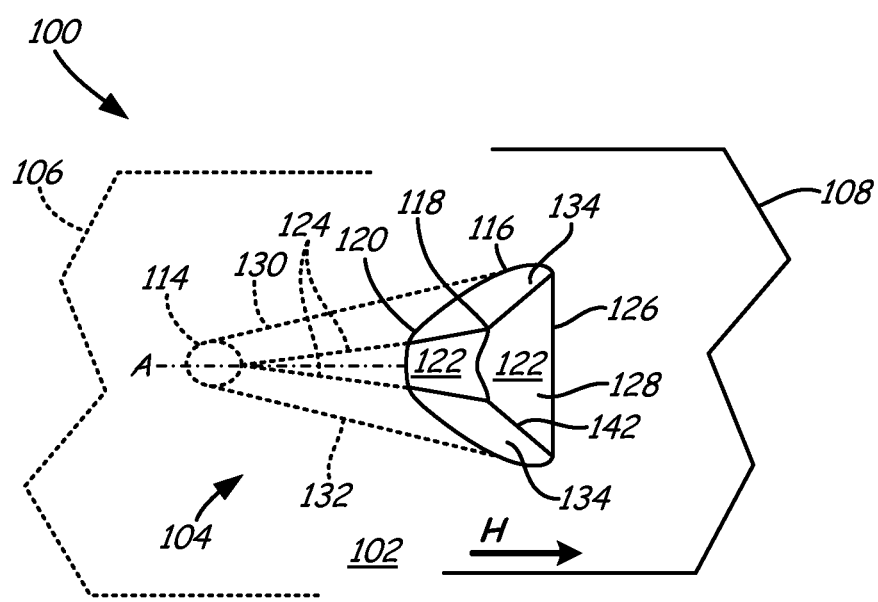
FIG. 7B is a schematic view of the gas path wall, with a smooth-out divider cooling hole geometry.

Alternatively, two or more transition regions 128 extend along trailing edge 126, as defined between three or more lobes 134 (see, e.g., FIG. 5A), or a generally trapezoidal transition region 128 is provided (FIG. 7B). In each of these configurations, one or more transition regions 128 extend along substantially all of trailing edge 126, eliminating cusps and other irregularities to encourage attachment and reduce separation for more uniform coverage and higher cooling efficiency.

Figure 5A:
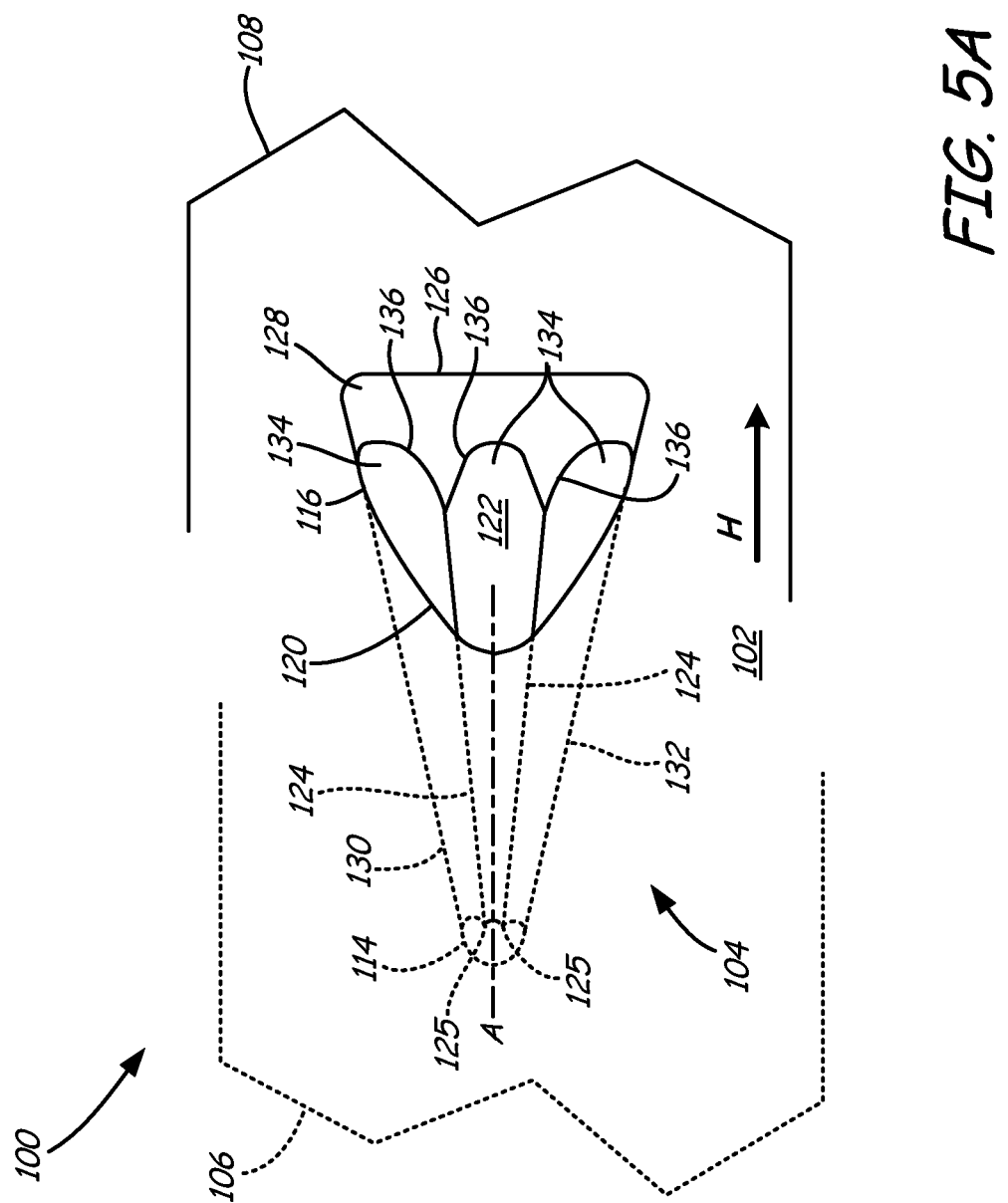
FIG. 5A is a schematic view of the gas path wall, illustrating a three-lobe cooling hole geometry.

FIG. 5A is a schematic view of gas turbine engine component 100 with gas path wall 102, illustrating a three-lobe geometry for cooling hole 104. In this configuration, two longitudinal ridges 124 separate cooling hole 104 into three lobes. Each of longitudinal ridges 124 extend from cusps 125 to transitions 118. Thus, cooling hole 104 has two cusps 125 and two transitions 118 in this configuration. Cusps 125 are positioned at inlet 114 and discourage swirl and vortex formation. Transition region 128 extends from transitions 118 to trailing edge 126 of outlet 116. Transition region 128 is defined between arcuate extensions 136 and trailing edge 126. Transition region 128 extends along substantially an entire length of trailing edge 126. Transition region 128 separates lobes 134 from outlet 116. Transition region 128 can be flat or convexly curved longitudinally and/or laterally, encouraging flow attachment and reducing separation for more uniform coverage and higher cooling efficiency. Transition region 128 can also eliminate sharp corners or ridges and in turn reduce thermal mechanical fatigue.

Figure 5B:
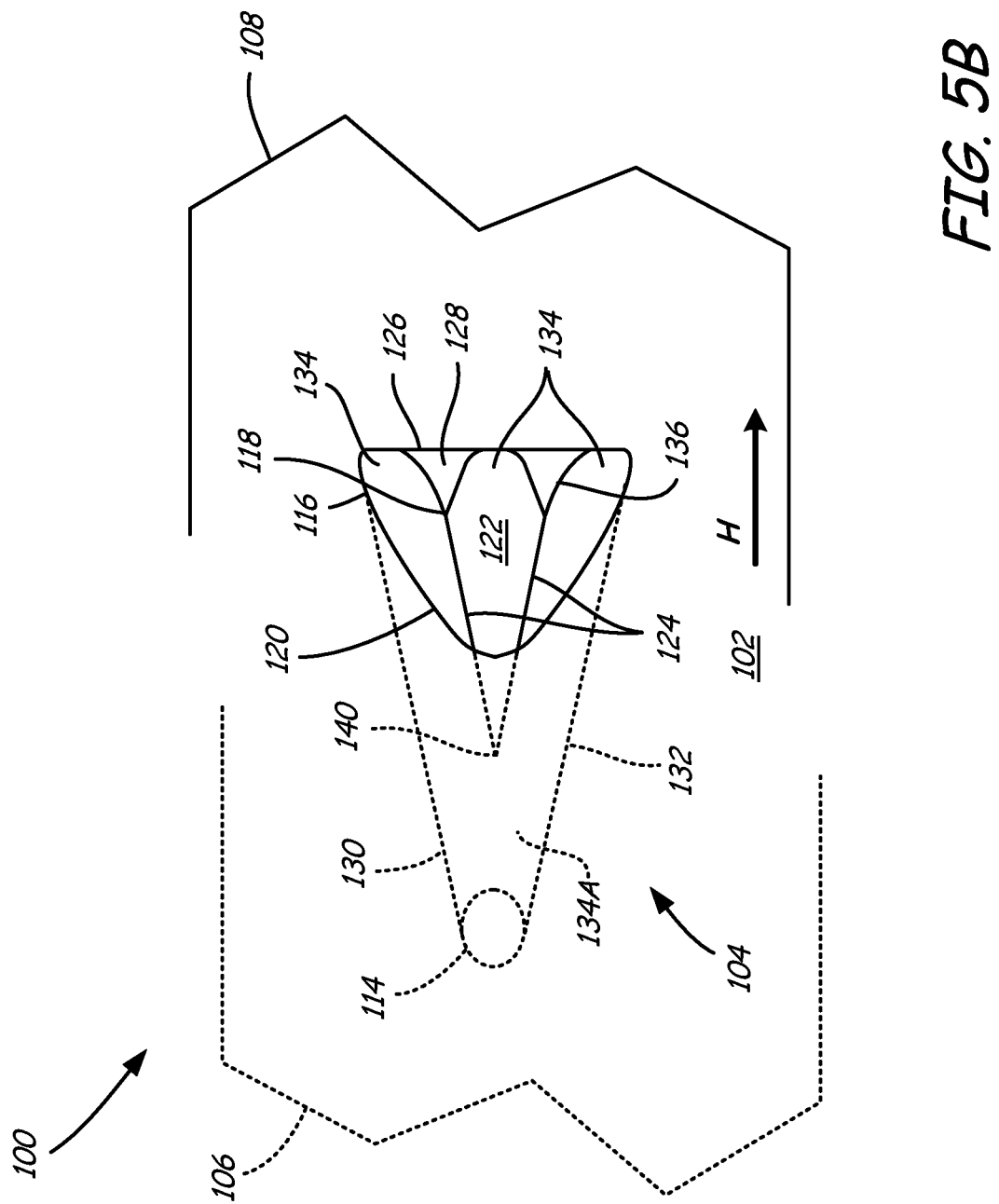
FIG. 5B is a schematic view of the gas path wall, illustrating an alternate truncated lobe geometry.

FIG. 5B is a schematic view of gas turbine engine component 100 with gas path wall 102, illustrating an alternate truncated lobe geometry for cooling hole 104. In this configuration, two longitudinal ridges 124 terminate at ridge nexus 140, with no longitudinal ridge 124 between inlet 114 and ridge nexus 140.

Thus, cooling hole 104 has a single-lobe configuration from inlet 114 to ridge nexus 140, and a three-lobe configuration from ridge nexus 140 to outlet 116. Outside lobes 134 merge at ridge nexus 140 and middle lobe 134 truncates, so that only one lobe 134A extends between inlet 114 and ridge nexus 140, while three lobes 134 extend between ridge nexus 140 and outlet 116.

Figure 6A:
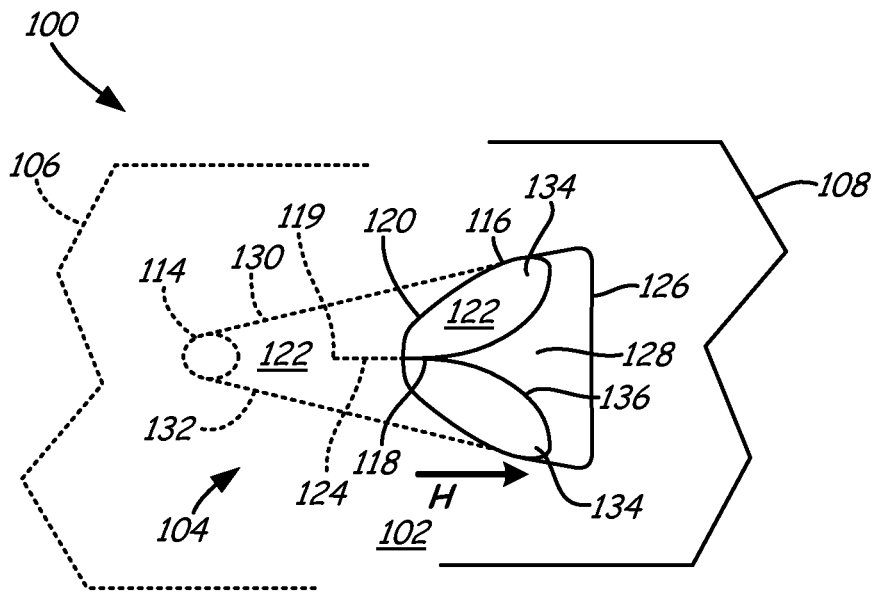
FIG. 6A is a schematic view of the gas path wall, illustrating a truncated two-lobe cooling hole geometry.

FIG. 6A is a schematic view of gas turbine engine component 100 with gas path wall 102, illustrating a truncated two-lobe geometry for cooling hole 104. In this configuration, longitudinal ridge 124 is not present between (circular or oval) inlet 114 and ridge terminus 119. Instead, longitudinal ridge 124 extends from ridge terminus 119 to transition 118, separating cooling hole 104 into two lobes 134 in the region of outlet 116. Arcuate extensions 136 define a single transition region 128, extending between adjacent lobes 134 from transition 118 to trailing edge 126 of outlet 116. Transition region 128 separates lobes 134 from outlet 116.

Figure 6B:
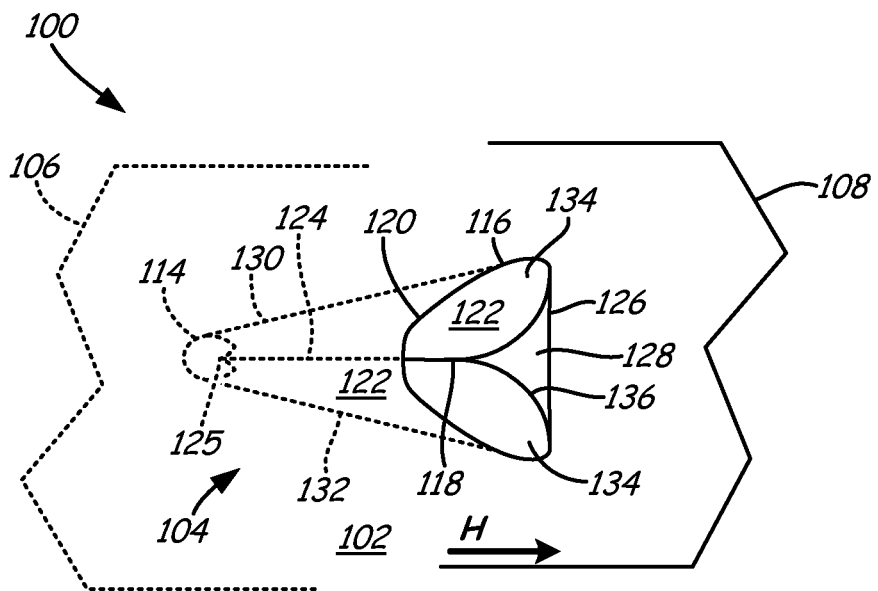
FIG. 6B is a schematic view of the gas path wall, illustrating a cusped inlet cooling hole geometry.

FIG. 6B is a schematic view of gas turbine engine component 100 with gas path wall 102, illustrating a cusped inlet geometry for cooling hole 104. Cusp 125 discourages swirl and vortex formation.

The geometries of longitudinal ridge 124 and cusp 125 vary. One or both of longitudinal ridge 124 and cusp 125 may be formed as long, narrow features extending along the wall of cooling hole 104, for example where two sloping sides (e.g., of lobes 134) meet, or as a narrow raised band or rib structure. Longitudinal ridge 124 and cusp 125 may also be either substantially pointed or rounded, for example where two curved lobe or wall surfaces meet, or where the direction of curvature reverses along the wall of cooling hole 104. Longitudinal ridge 124 and cusp 125 may also be formed as arched or cone-shape features, for example at the boundary of two lobes 134.

In this particular configuration, a single longitudinal ridge 124 separates cooling hole 104 into two lobes 134, extending from transition 118 to define cusp 125 on inlet 114, at first surface 106 of gas path wall 102. Cusp 125 extends congruently with longitudinal ridge 124, from inlet 114 to transition 118 along downstream surface 122 of cooling hole 104. Arcuate extensions 136 extend from transition 118 to trailing edge 126 of cooling hole 104, defining transition region 128 between adjacent lobes 134.

Like longitudinal ridge 124, cusp 125 projects laterally away from downstream surface 122 toward the axis of cooling hole 104 (see FIG. 3C), discouraging transverse flow components to generate swirl along cooling hole 104, with fewer losses at outlet 116. In continuously diverging designs, moreover, where flow is diffusive through substantially the entire length of cooling hole 104, metering can be determined primarily by the size and geometry of inlet 114.

FIG. 7A is a schematic view of gas turbine engine component 100 with gas path wall 102, illustrating an three-lobe cusped inlet geometry for cooling hole 104. In this configuration, two longitudinal ridges 124 extend from cusp 125 at inlet 114 to transition 118, dividing cooling hole 104 into three lobes 134.

FIG. 7B is a schematic view of gas turbine engine component 100 with gas path wall 102, illustrating a "flushed" ridge configuration for cooling hole 104. In this design, longitudinal ridge 124 extend from inlet 114, dividing cooling hole 104 into two lobes between first surface 106 of gas path wall and transition 118. As shown in FIG. 7B, however, longitudinal ridge 124 is smoothed out and terminates at transition region 128, as bounded between intersections 142 along adjacent (outer) lobes 134.

Unlike arcuate extensions 136 of longitudinal ridges 124, intersections 142 do not extend above downstream surface 122 toward axis A of cooling hole 104. Instead, transition region 128 is congruent with downstream surface 122, and adjacent lobes 134 extend up from intersections 142 toward second (upper) surface 108 of gas path wall 102.

The overall geometry of cooling hole 104 thus varies, as described above, and as shown in the figures. The design of inlet 114 and outlet 116 may also vary, including various circular, oblate, oval, trapezoidal, triangular, cusped and delta shaped profiles with arcuate or piecewise linear upstream surfaces 120 and straight or convex trailing edges 126. The configuration of cooling hole 104 is not limited to these particular examples, moreover, but also encompasses different combinations of the various features that are shown, including a variety of different cusps 125, transitions 118 with different circular, elliptical, oblong and cusped cross sections, and diffusion portions 112 with one, two, three, or more lobes 134, in combination with different transition regions 128 bordered by arcuate extensions 136 and intersections 142.

Figure 8:
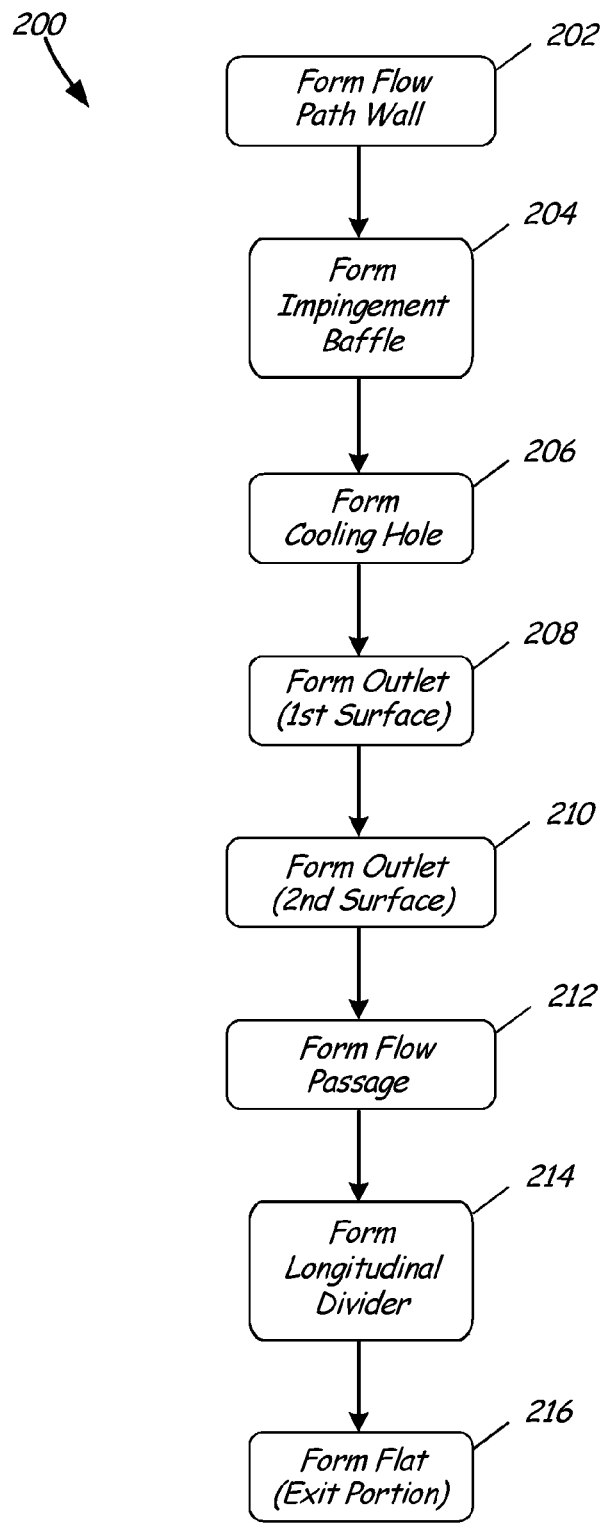
FIG. 8 is a block diagram illustrating a method for forming an impingement and film cooling assembly for a gas turbine engine component.

FIG. 8 is a block diagram illustrating method 200 for forming an impingement and film (float wall) cooling assembly for a gas turbine engine component. For example, method 200 may be used to form cooling assembly 70 with impingement baffle 80 and gas path wall 102 for a combustor liner, turbine exhaust assembly, exhaust nozzle, augmentor or other gas turbine engine component 100, as described above. Alternatively, method 200 may be used to form cooling assembly 70 with cooling holes 104 configured as cooling holes 60 in rotor airfoil 22 or stator airfoil 24, as shown in FIGS. 2A and 2B, or in another airfoil component 100.

Method 200 includes forming a gas path wall (step 202) for the component, forming an impingement baffle (step 204) spaced from the gas path wall, and forming a cooling hole (step 206) in the gas path wall. For example, forming a cooling hole (step 206) may include forming an inlet in a first (e.g., cool) surface of the gas path wall (step 208), forming an outlet in a second (e.g., hot) surface of the gas path wall (step 210), and forming a cooling hole (step 212) between the inlet and the outlet.

The cooling hole (step 212) extends from the first surface of the gas path wall to the second surface, diverging continuously between the inlet and the outlet. That is, the cross-sectional flow area of the cooling hole increases continuously from the inlet at the first surface through the cooling hole to the outlet at the second surface, and flow is diffusive along substantially the entire corresponding length of the cooling hole.

One or more longitudinal ridges (step 214) may be formed along the cooling hole to divide the cooling hole into lobes. The longitudinal ridges are formed as rib, ridge or cusps, as described above, for example along a downstream surface of the cooling hole. The longitudinal ridges extend out from the wall toward the axis of the cooling hole, dividing the cooling hole into lobes to discourage swirl and reduce losses at the outlet.

In some designs, the ridge extends from a cusp at the inlet toward the outlet, and in other designs the ridge extends from a ridge terminus located between the inlet and the outlet. In additional designs, a transition region (step 216) extends from the longitudinal ridge to the trailing edge of the outlet.

The gas turbine engine components, gas path walls and cooling holes described herein can thus be manufactured using one or more of a variety of different processes. These techniques provide each cooling hole with its own particular configuration and features, including, but not limited to, inlet, metering, transition, diffusion, outlet, upstream surface, downstream surface, lateral surface, longitudinal, lobe and downstream edge features, as described above. In some cases, multiple techniques can be combined to improve overall cooling performance or reproducibility, or to reduce manufacturing costs.

Suitable manufacturing techniques for forming the cooling configurations described here include, but are not limited to, electrical discharge machining (EDM), laser drilling, laser machining, electrical chemical machining (ECM), water jet machining, casting, conventional machining and combinations thereof. Electrical discharge machining includes both machining using a shaped electrode as well as multiple pass methods using a hollow spindle or similar electrode component. Laser machining methods include, but are not limited to, material removal by ablation, trepanning and percussion laser machining. Conventional machining methods include, but are not limited to, milling, drilling and grinding.

The gas path walls and outer surfaces of some gas turbine engine components include one or more coatings, such as bond coats, thermal barrier coatings, abrasive coatings, abradable coatings and erosion or erosion-resistant coatings. For components having a coating, the inlet, transition, and outlet cooling features may be formed prior to a coating application, after a first coating (e.g., a bond coat) is applied, or after a second or third (e.g., interlayer) coating process, or a final coating (e.g., environmental or thermal barrier) process. Depending on component type, cooling hole or passage location, repair requirements and other considerations, the outlet features may be located within a wall or substrate, within a thermal barrier coating or other coating layer applied to a wall or substrate, or combinations thereof. The cooling geometry and other features may remain as described above, regardless of position relative to the wall and coating materials or airfoil materials.

In addition, the order in which cooling features are formed and coatings are applied may affect selection of manufacturing techniques, including techniques used in forming the inlet, transition, outlet, and other cooling features. For example, when a thermal barrier coat or other coating is applied to the outer surface of a gas path wall before the cooling hole is produced, laser ablation or laser drilling may be used. Alternatively, either laser drilling or water jet machining may be used on a surface without a thermal barrier coat. Additionally, different machining methods may be more or less suitable for forming different features of the cooling hole, for example, different EDM, laser machining and other machining techniques may be used for forming the outlet and diffusion features, and for forming the transition, metering and inlet features.

While the invention is described with reference to exemplary embodiments, it will be understood by those skilled in the art that various changes may be made and equivalents may be substituted without departing from the spirit and scope of the invention. In addition, different modifications may be made to adapt the teachings of the invention to particular situations or materials, without departing from the essential scope thereof. The invention is thus not limited to the particular examples disclosed herein, but includes all embodiments falling within the scope of the appended claims.

DISCUSSION OF POSSIBLE EMBODIMENTS

The following are non-exclusive descriptions of possible embodiments of the present invention.

A gas turbine engine component can have a gas path wall and an impingement baffle. The gas turbine engine component includes a gas path wall having a first surface and second surface. The impingement baffle has impingement holes for directing cooling fluid onto the first surface of the gas path wall. A cooling hole extends through the gas path wall. The cooling hole continuously diverges from an inlet in the first surface to an outlet in the second surface such that cross-sectional area of the cooling hole increases continuously from the inlet to the outlet. A longitudinal ridge divides the cooling hole into lobes.

The component of the preceding paragraph can optionally include, additionally and/or alternatively any, one or more of the following features, configurations and/or additional components:

a cusp can be on the inlet and the longitudinal ridge can extend from the cusp along the cooling hole toward the outlet of the cooling hole;

a ridge terminus can be spaced along the cooling hole between the inlet and the outlet, the longitudinal ridge can terminate at the ridge terminus, and the longitudinal ridge can extend from the ridge terminus and along the cooling hole toward the outlet;

the cooling hole can be one of a plurality of cooling holes, and a total flow area of all of the impingement holes can be less than a total flow area of all of the cooling holes;

the cooling hole can be one of a plurality of cooling holes, each of the impingement holes can be paired with and positioned upstream of one of the cooling holes, and a flow area of at least one of the impingement holes is less than a flow area of at least one of the cooling holes;

the impingement holes can be substantially cylindrical;

bumps can extend from the first surface toward the impingement baffle and be substantially aligned with the impingement holes;

the bumps can have a convex surface with a relatively steep slope in a longitudinally upstream direction and a relatively gradual slope in a longitudinally downstream direction;

a transition region can extend from the longitudinal ridge to a trailing edge of the outlet, and the longitudinal ridge can terminate at the transition region; and/or a combustor assembly can include the component.

A liner assembly for a gas turbine engine can include an impingement baffle and a liner wall having a first surface extending along the impingement baffle and a second surface extending opposite the first surface. A cooling hole can be formed in the liner wall. The cooling hole can diverge continuously from an inlet in the first surface to an outlet in the second surface. A longitudinal ridge can divide the cooling hole into lobes. The cooling hole can be substantially diffusive from the inlet in the first surface of the liner wall to the outlet in the second surface of the liner wall.

The liner assembly of the preceding paragraph can optionally include, additionally and/or alternatively any, one or more of the following features, configurations and/or additional components:

the longitudinal ridge can be a first longitudinal ridge and first and second longitudinal ridges can divide the cooling hole into the first, second, and third lobes.

the longitudinal ridge can extend toward the outlet from a ridge terminus spaced along the cooling hole between the inlet and the outlet;

the longitudinal ridge can extend to a transition region of the cooling hole and can extend from the longitudinal ridge to a trailing edge of the outlet;

the cooling hole can be one of a plurality of cooling holes and each of the impingement holes can be paired with and positioned upstream of one of the cooling holes;

the impingement holes can be substantially elongated slots;

bumps can extend from the first surface toward the impingement baffle and be substantially aligned with the impingement holes;

the bumps can have a convex surface with a relatively steep slope in a longitudinally upstream direction and a relatively gradual slope in a longitudinally downstream direction;

a combustor can include the liner assembly; and/or a gas turbine engine can include the liner assembly.

The invention claimed is:

1. A gas turbine engine component comprising:
   a gas path wall having a first surface and second surface;
   an impingement baffle having impingement holes for directing cooling fluid onto the first surface of the gas path wall;
   a cooling hole extending through the gas path wall, the cooling hole continuously diverging from an inlet in the first surface to an outlet in the second surface such that cross-sectional area of the cooling hole increases continuously from the inlet to the outlet; and
   a longitudinal ridge dividing the cooling hole into lobes.

2. The component of claim 1, and further comprising:
   a cusp on the inlet, wherein the longitudinal ridge extends from the cusp along the cooling hole toward the outlet of the cooling hole.

3. The component of claim 1, and further comprising:
   a ridge terminus spaced along the cooling hole between the inlet and the outlet, wherein the longitudinal ridge terminates at the ridge terminus, and wherein the longitudinal ridge extends from the ridge terminus and along the cooling hole toward the outlet.

4. The component of claim 1, wherein the cooling hole is one of a plurality of cooling holes, and wherein a total flow area of all of the impingement holes is less than a total flow area of all of the cooling holes.

5. The component of claim 1, wherein the cooling hole is one of a plurality of cooling holes, wherein each of the impingement holes are paired with and positioned upstream of one of the cooling holes, and wherein a flow area of at least one of the impingement holes is less than a flow area of at least one of the cooling holes.

6. The component of claim 1, wherein the impingement holes are substantially cylindrical.

7. The component of claim 1, and further comprising:
   bumps extending from the first surface toward the impingement baffle and substantially aligned with the impingement holes.

8. The component of claim 7, wherein the bumps have a convex surface with a relatively steep slope in a longitudinally upstream direction and a relatively gradual slope in a longitudinally downstream direction.

9. The component of claim 1, and further comprising:
   a transition region extending from the longitudinal ridge to a trailing edge of the outlet, wherein the longitudinal ridge terminates at the transition region.

10. A combustor assembly comprising the component of claim 1.

11. A liner assembly for a gas turbine engine, the liner assembly comprising:
    an impingement baffle having impingement holes;
    a liner wall having a first surface extending along the impingement baffle and a second surface extending opposite the first surface;
    a cooling hole formed in the liner wall, the cooling hole diverging continuously from an inlet in the first surface to an outlet in the second surface; and
    a longitudinal ridge dividing the cooling hole into lobes;
    wherein the cooling hole is substantially diffusive from the inlet in the first surface of the liner wall to the outlet in the second surface of the liner wall.

12. The liner assembly of claim 11, wherein the longitudinal ridge is a first longitudinal ridge, and further comprising:
    a second longitudinal ridge; and
    a third lobe, wherein the first and second longitudinal ridges divide the cooling hole into the first, second, and third lobes.

13. The liner assembly of claim 11, wherein the longitudinal ridge extends toward the outlet from a ridge terminus spaced along the cooling hole between the inlet and the outlet.

14. The liner assembly of claim 11, wherein the longitudinal ridge extends to a transition region of the cooling hole, the transition region extending from the longitudinal ridge to a trailing edge of the outlet.

15. The liner assembly of claim 11, wherein the cooling hole is one of a plurality of cooling holes and wherein each of the impingement holes are paired with and positioned upstream of one of the cooling holes.

16. The liner assembly of claim 11, wherein the impingement holes are substantially elongated slots.

17. The liner assembly of claim 11, and further comprising:
    bumps extending from the first surface toward the impingement baffle and substantially aligned with the impingement holes.

18. The liner assembly of claim 17, wherein the bumps have a convex surface with a relatively steep slope in a longitudinally upstream direction and a relatively gradual slope in a longitudinally downstream direction.

19. A combustor comprising the liner assembly of claim 11.

20. A gas turbine engine comprising the liner assembly of claim 11.

* * * * *